United States Patent [19]

Wallace et al.

[11] 4,255,367
[45] Mar. 10, 1981

[54] METHOD FOR INJECTION MOLDING ARTICLES WHEREIN ADDITIVES ARE ADDED IN SELECTIVE PORTIONS

[75] Inventors: Clarence W. Wallace, Pittsfield, Mass.; Howard A. Koenig, Medina, Ohio

[73] Assignee: Standard Oil Company (Indiana), Chicago, Ill.

[21] Appl. No.: 944,359

[22] Filed: Sep. 21, 1978

Related U.S. Application Data

[62] Division of Ser. No. 692,339, Jun. 3, 1976, Pat. No. 4,135,870.

[51] Int. Cl.³ .............................................. B29D 27/00
[52] U.S. Cl. ................................ 264/45.1; 264/328.18; 264/328.19; 264/DIG. 83; 425/145; 425/162; 425/558
[58] Field of Search .............. 264/DIG. 83, 211, 45.1, 264/328.18, 328.19; 425/4 R, 130, 145, 558

[56] References Cited

U.S. PATENT DOCUMENTS

| | | | |
|---|---|---|---|
| 3,436,446 | 4/1969 | Angell | 264/DIG. 83 |
| 3,687,582 | 8/1972 | Hendry et al. | 264/DIG. 83 |
| 3,746,492 | 7/1973 | DeVita | 425/558 X |
| 3,751,534 | 8/1973 | Oxley | 264/54 X |
| 3,776,989 | 12/1973 | Annis et al. | 264/DIG. 83 |
| 3,817,675 | 6/1974 | Maiocco | 264/DIG. 83 |
| 3,876,736 | 4/1975 | Takiura | 425/145 X |
| 3,891,362 | 6/1975 | DeVita | 264/DIG. 83 |
| 3,941,529 | 3/1976 | Klingebiel | 264/DIG. 83 |
| 4,033,710 | 7/1977 | Hanning | 264/DIG. 83 |
| 4,067,673 | 1/1978 | Hendry | 264/DIG. 83 |
| 4,115,491 | 9/1978 | Hanning | 264/DIG. 83 |
| 4,134,687 | 1/1979 | Eckardt | 264/45.1 X |
| 4,135,870 | 1/1979 | Wallace et al. | 425/130 |

FOREIGN PATENT DOCUMENTS

| | | | |
|---|---|---|---|
| 1809106 | 6/1970 | Fed. Rep. of Germany | 425/4 R |
| 2500972 | 7/1976 | Fed. Rep. of Germany | 264/DIG. 83 |
| 1156217 | 6/1969 | United Kingdom . | |

OTHER PUBLICATIONS

Rubin, Irving I., "Injection Molding Theory and Practice", New York, John Wiley and Sons, ©1972, pp. 2-7.

*Primary Examiner*—Philip Anderson
*Attorney, Agent, or Firm*—David E. Boone; William T. McClain; William H. Magidson

[57] ABSTRACT

A method for injection molding an article wherein additives are selectively introduced into the polymer melt downstream of an accumulation device and upstream of a static mixer just prior to its introduction into the mold cavity. The additives include U.V. stabilizers, flame retardant materials, colorants and blowing agents. The method produces injection molded articles with selective amounts of additives in either the skin or core portions of the articles.

5 Claims, 8 Drawing Figures

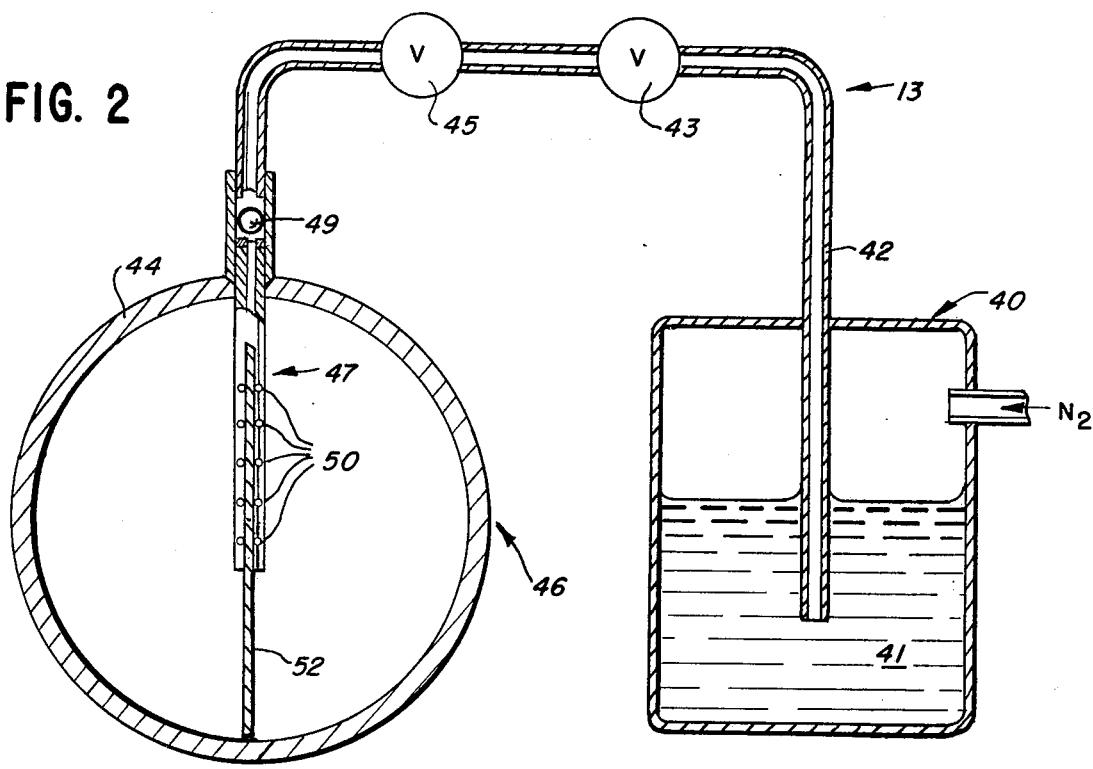
FIG. 2
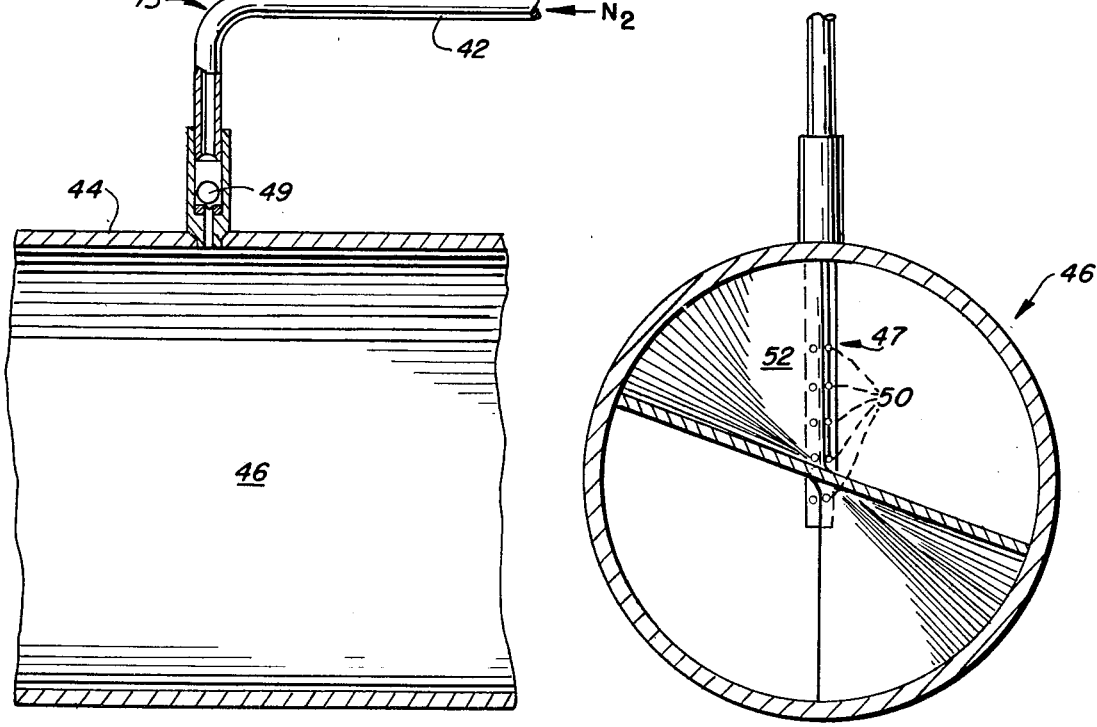
FIG. 3
FIG. 4

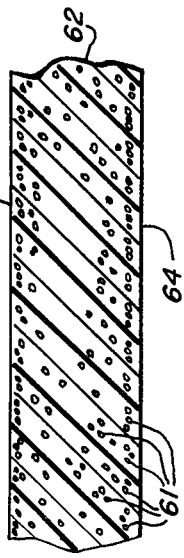
FIG. 5
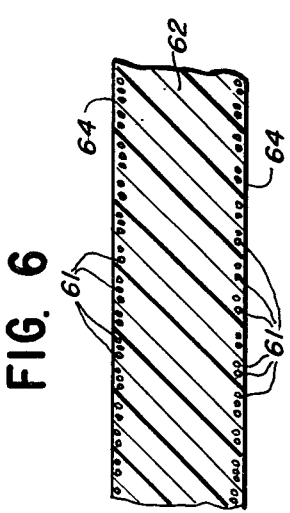
FIG. 6
FIG. 7
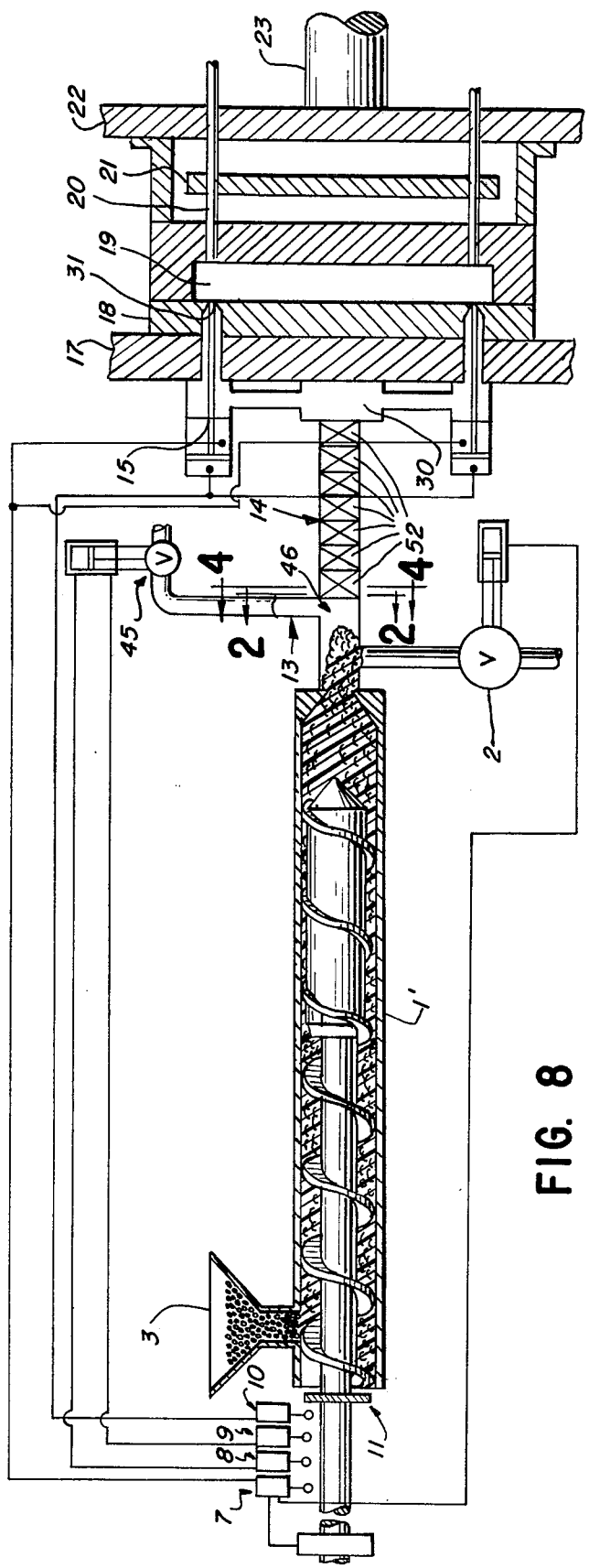
FIG. 8

METHOD FOR INJECTION MOLDING ARTICLES WHEREIN ADDITIVES ARE ADDED IN SELECTIVE PORTIONS

This is a division, of application Ser. No. 692,339, filed June 3, 1976 now U.S. Pat. No. 4,135,870.

BACKGROUND OF THE INVENTION

1. Field of the Invention

This invention is directed to an improvement in the art of forming foamed and unfoamed molded plastic articles.

2. Description of the Prior Art

"Additives" throughout this Specification and Claims are defined to mean substances or materials added to thermoplastic resins. Examples of such additives are flame retardants, U.V. stabilizers, blowing agents, colorants, etc. Examples of thermoplastic resins useful in this invention are polyethylene, polypropylene, polystyrene, polyvinyl chloride, copolymers thereof and the like. In general, any injection moldable thermoplastic resin can be used. The following, for purposes of discussion, considers prior art relating to blowing agent additives.

Prior methods and apparatus for adding blowing agents to a plastic resin to form solid skin and foamed core (SSFC) articles are exemplified in the patents to De Vita, U.S. Pat. No. 3,746,492 (1973), D. F. Oxley, U.S. Pat. No. 3,751,534 (1973), P. J. Garner and D. F. Oxley, U.K. Pat. No. 1,156,217 (1969), and R. G. Angell, Jr. U.S. Pat. No. 3,436,446 (1969). In each of the above cited art, a blowing agent is introduced into a thermoplastic material to form a foamable plastic mixture. This mixture is then accumulated under pressure in an accumulator or an injector. An injector is used throughout this Specification and Claims to mean a device capable of both accumulating and injecting under pressure molten plastic into a mold. Some examples of injectors are the accumulators disclosed in the above cited art and reciprocating screw or plunger injection molding machines such as sold by Cincinnati Milacron.

One known method for injecting foamable and unfoamable plastic material alternately into a mold involves the use of two coupled injection systems, one for foamable and the other for unfoamable plastic materials. These systems are arranged to inject alternately through a single nozzle. Another known method uses a single injection system containing discrete layers of foamable and unfoamable plastic material. Upon injection, each discrete layer enters the mold separately, thereby injecting alternately in a single injection stroke foamable and unfoamable plastic into a mold.

There are several disadvantages inherent to these known methods. In the case where two injection systems are required, there are the substantial equipment costs and the need during filling for back-pressures in one of the injector systems to prevent premature foaming. Similarly, in the case where a single injection system employs discrete layers of foamable and unfoamable plastic, back-pressures on the foamable plastic material is required prior to injection in order to prevent premature foaming. In general, process control is more difficult where back-pressures are necessary. Further where an additive other than a blowing agent is added to a molten plastic before the molten plastic material is accumulated in an accumulator, degradation of said material often occurs to such a degree as to preclude the use of many otherwise useful additives.

H. L. Maiocco, U.S. Pat. No. 3,817,675 (1974) discloses an apparatus for introducing a measured quantity of colorants into a plasticized plastic stream just downstream of an extruder and just upstream of a mixer. This apparatus is similar to De Vita ('492) in that in De Vita a blowing agent instead of a colorant is introduced just downstream of an extruder and just upstream of a mixer.

Maiocco ('675) as disclosed has several limitations. There is no provision for selectively adding colorants to a plasticized plastic. There is no discussion concerning the addition of blowing agents, U.V. stabilizers or flame retardants. There is not disclosed the substitution of an injector for an extruder. That there is no means disclosed for selectively adding colorants makes a process of selectively introducing additives either into the skin or core of a molded plastic article very difficult to achieve. Since the substitution of an injector with its accumulation zone for an extruder is not disclosed, there is not taught a practical means for injecting in a periodic flow the quantities of a plasticized plastic often required during an injection molding cycle.

BRIEF DESCRIPTION OF THE INVENTION

In one embodiment, the invention comprises the utilization of a machine for producing foamed core and foamed or unfoamed solid skin molded plastic articles. A unique feature of this machine over that disclosed in the above cited prior art resides in the time and location of introducing an additive into a molten plastic. The time for the introduction of the additive in this invention is during the injection of molten plastic, and the location is downstream of an injector. The steps for introducing molten plastic material into a mold is as follows: (1) ejecting a molten plastic from an injector to form a stream, (2) introducing selectively an additive into said stream, (3) mixing the product of step (2), and (4) flushing out any additive-containing plastic between the point of introducing said additive and the mold entrance. The details of the step of flushing will be discussed later. This sequence of events is determined by a series of switches activated as a piston of an accumulator or an injector moves through "activation points" or "activation positions" during the emptying of said accumulator or injector. The timing and duration of each of the above events is determined by the rate of motion of said piston and distance between these activation points. The total time for steps (1) to (4) requires a maximum of approximately 30 seconds. The total cycle time depends upon several factors known to a man of skill in the art.

In another embodiment, the sequence of steps for introducing a material into a molded plastic article is (1) melting a thermoplastic resin, (2) transferring said thermoplastic resin to any accumulation zone where it is maintained in a molten state, (3) ejecting said resin from said accumulation zone to form a molten plastic stream, (4) introducing into said stream an additive, (5) mixing said additive and said stream to form a mixture thereof, and (6) channelling said mixture into a mold.

One or more mixers downstream from the accumulation zone of an injector insure uniform dispersion of the additive throughout the molten plastic. A measure of the efficiency of a mixer can be determined based upon the cell structure of the foamed plastic. Further, since the rate at which a molten plastic will fill a mold is dependent in part upon the pressure imposed upon said plastic, and since a pressure drop necessarily will result from the plastic flowing through one or more mixers prior to entering the mold, care must be exercised so that the pressure on the plastic at the point of injection into the mold is sufficient to insure rapid transfer of the plastic from the accumulator or injector into the mold.

In the above discussion, additive was used generically, but for purposes of clarity an example dealing with a blowing agent as an additive will be considered. One of the machines in this case can produce SSFC articles. To understand the operation of this machine, a discussion of four switches contained therein is necessary. A first switch signals that the injector is full and ready to begin filling the mold with plastic and a last switch closes a nozzle or gate to a mold. A second switch opens and a third closes a valve in a means for introducing a blowing agent into the ejected molten plastic. The distance between activation points for the first and second switches influences the amount by weight of unfoamable plastic which is injected into the mold before a blowing agent is introduced into the molten plastic. This initial shot of unfoamable plastic will influence the amount by weight of unfoamed skin on a finished part. The distance between the activation points for the second and third switches determines the amount by weight of foamed core formed in a resulting plastic part. The distance between the activation points for the third and fourth switches controls the process of flushing. The distance between the activation points of the third and fourth switches is adjusted to insure that sufficient unfoamable plastic is injected through the mixer and nozzle manifold so that all feed channels between the point of blowing agent introduction and the mold entrances are filled with unfoamable plastic and optionally, so that a final portion of plastic introduced into the mold is unfoamable. If flushing is complete, then the initial injection into the mold for the next part will be only unfoamable plastic. It is to be noted that pairwise the first and second, and the third and fourth switches can be combined. The result of combining switches is to provide a machine capable of uniformly distributing an additive throughout both the core and skin of a molded plastic article.

The blowing agent introduced into the molten plastic material may be either chemical or physical. Examples of physical blowing agents are compounds which are or become gaseous due to a change in physical state. Examples of such compounds are compressed air, nitrogen, pentane, hexane, etc. Examples of chemical blowing agents are substances which decompose giving rise to gases. Examples of such substances are azo compounds, semicarbazides, azides, diazoamino compounds, etc. In the case of a chemical blowing agent dispersion, the most efficient mixing occurs when the viscosity of the chemical blowing agent dispersion is comparable to that of the molten plastic material.

The quantity of chemical blowing agent dispersion introduced for a given period of time is determined by the pressure imposed upon and the resistance to flow of the chemical blowing agent dispersion. The flow rate of chemical blowing agent from a reservoir through a tube into a molten plastic material is controlled by two valves one a precision needle valve or other flow controlling means and the other an on-off valve such as an electrically controlled solenoid.

In a more generalized form, the invention comprises a method for introducing an additive into a molten plastic. Previously, the introducing of a blowing agent into a portion of injected molten plastic was considered. In a similar manner, additives such as U.V. stabilizers, flame retardants, and colorants can be introduced selectively so that they become part of either the skin and/or the core of a finished molded article. There are several reasons for introducing additives downstream of the injector in the manner disclosed; for example, the location of the additive in the core and/or in the skin of the finished molded article can be readily controlled; the length of time said additive is subjected to high temperatures and pressures is considerably reduced over cited art methods; and back-pressures such as discussed in the patent to De Vita ('492) during the filling of an accumulator or injector can be avoided. In general, colorants', flame retardants', and U.V. stabilizers' effectiveness is directly proportional to their concentration at or near the surface. Therefore, greater effectiveness for a given weight of such additives will occur if it is concentrated at or close to the surface rather than uniformly distributed throughout the molded plastic article. Further, as an additional advantage, the use of pigments selectively at the surface of a thick structural foam article permits the use of less pigment with a resulting savings in pigment costs.

It is an object of this invention to provide the utilization of a machine for introducing additives downstream of an injector.

It is an object of this invention to provide the utilization of a machine capable with minor adjustments of producing either swirl or swirl-free foamed core molded plastic articles.

It is an object of this invention to provide a method for using many additives which cannot otherwise be used in producing injection molded plastic articles.

It is an object of this invention to provide a method for selectively introducing additives either into the skin or core of a molded plastic article.

Other objects of this invention will be clear to a man of average skill in the art once the teachings of this Application are disclosed.

DETAILED DESCRIPTION OF THE INVENTION

FIG. 2 is the apparatus used to introduce a chemical blowing agent in the form of a dispersion into the molten plastic stream downstream of an injector and upstream of a mixer as viewed along line 2—2 of FIGS. 1 and 8.

FIG. 3 is the apparatus used to introduce a chemical or gaseous blowing agent at a wall downstream of an injector and upstream of a mixer.

FIG. 4 is a view along section line 4—4 of FIGS. 1 and 8.

FIG. 5 is a cross-section of a swirl-free SSFC thermoplastic article.

FIGS. 6 and 7 are cross-sectional views of molded plastic articles wherein an additive has been selectively added to the skin and core of each, respectively.

FIG. 8 is a schematic view of a portion of the machine of FIG. 1 wherein the extruder and accumulator have been replaced by a reciprocating screw injection molding machine.

Figure 1:
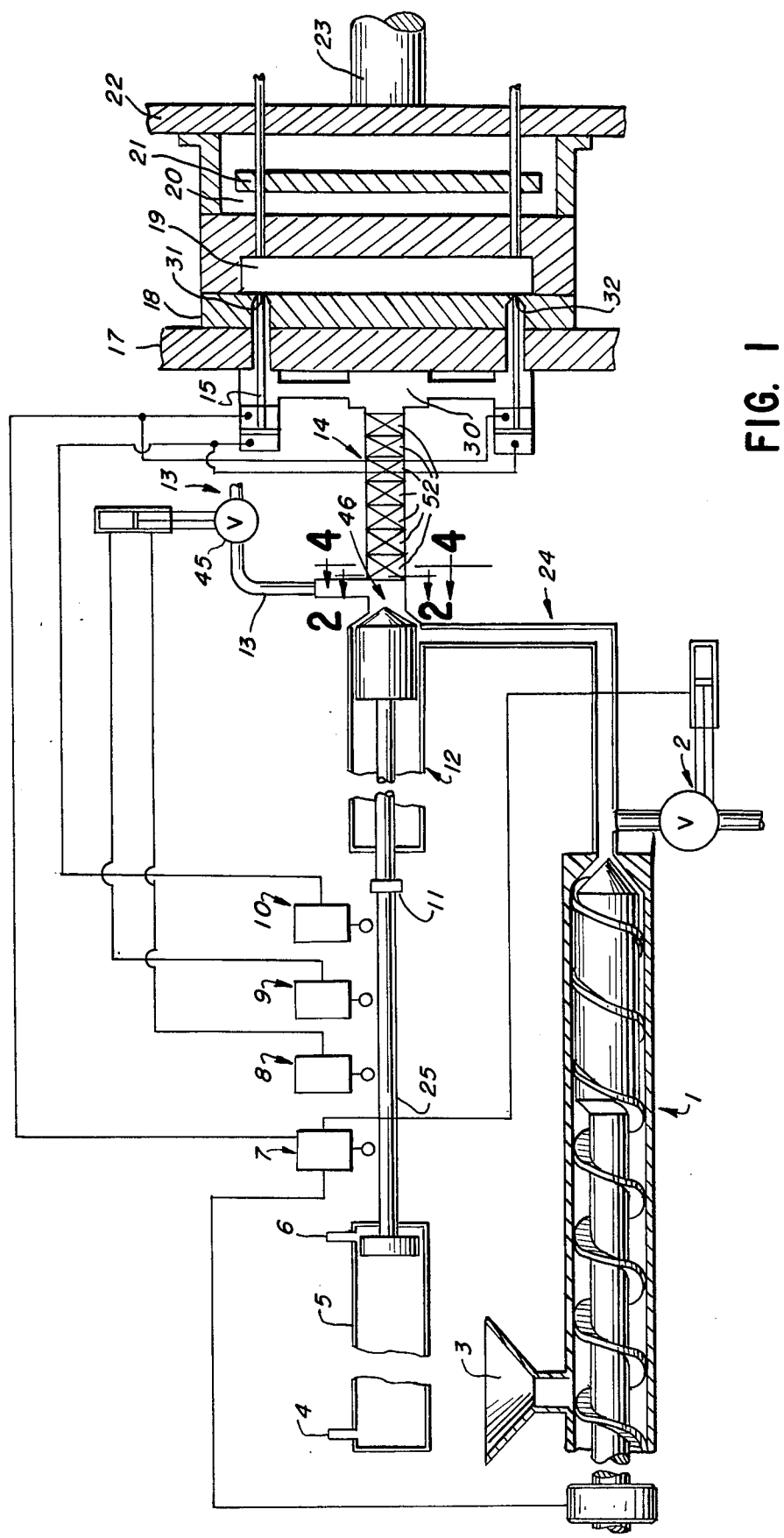
FIG. 1 is a schematic diagram of an apparatus to add an additive such as a blowing agent to a molded plastic article.

The elements comprising the apparatus disclosed in FIG. 1 are an extruder 1, a passageway 24 between extruder 1 and an accumulator 12, a dump valve 2, a piston-activating means comprising a cylinder 5 having inlets and outlets 4 and 6, a conduit 13 for introducing an additive, a mixer 14, an injection nozzle manifold 15 and a series of microswitches 7, 8, 9, and 10.

Thermoplastic material (not shown) at the upstream end is fed into hopper 3 at a rate dependent upon cycle time. This material is melted and leaves the extruder at a temperature of about 325°–800° F. The amount of pressure by which the pressure on the plastic at the extruder head exceeds the back-pressure of the accumulator 12 can vary depending upon the plastic being processed. For example, if high shear is required either for mechanical heating or mixing then the amount of the excess pressure is above 500 psi. If on the other hand low shear is required to prevent undesirable mechanical heating then the amount of the excess pressure is below 500 psi. The extruded thermoplastic material moves through passageway 24 to an accumulator 12.

The accumulator 12 of FIG. 1 is in its emptied configuration so that as thermoplastic material moves from the extruder 1 to the accumulator 12 piston arm 25 moves to the left and accumulator 12 becomes filled with molten thermoplastic material. During filling of the accumulator 12, a back-pressure is maintained on the piston.

The injection cycle beginning with the emptying of accumulator 12 involves the following sequence: (1) just as accumulator 12 is completely filled, cam 11 activates a first microswitch 7 which signals that the accumulator is full and ready to begin filling the mold with plastic. In the event that a longer time than usual is required to ready the mold for the next injection of plastic, then either excess plastic from extruder 1 exits out through dump valve 2 or in the absence of dump valve 2, the screw of extruder 1 is stopped. When the mold is ready a valve (not shown) in the manifold 15 opens and molten plastic is injected from accumulator 12 past a point for introducing an additive, through mixer 14 containing mixer elements 52, into manifold 15 and then into a mold means 17-23; (2) cam 11 activates a second microswitch 8 which opens valve 45, thereby introducing into said injected molten plastic an additive prior to mixer 14 and downstream of accumulator 12; (3) cam 11 activates a third micro switch 9 which closes valve 45 thereby stopping the introduction of any more additive; and (4) cam 11 activates a fourth microswitch 10 which closes manifold 15 and the accumulator 12 begins to fill for the next cycle. It is to be noted that the on-off periods for the valve in the means for introducing an additive can be changed as in EXAMPLES 4 and 5 so that the additive is introduced into an exterior portion of the stream of molten plastic ejected from an injector, i.e., selectively introduced into the skin of a finished molded article. It is further to be noted that pairwise the first and second, and the third and fourth microswitches can be combined into two switches when it is desired to have the additive introduced both into the skin and core of the finished molded article.

The portion of the injection process which will hereinafter be referred to as the step of flushing is determined by the distance between microswitches 9 and 10. The step of flushing insures that all thermoplastic material containing any additive between the point of injection for such additives and the mold entrance points 31 and 32 is replaced by additive-free thermoplastic material. Optionally, additive-free molten plastic can be introduced as the last portion of plastic to enter the mold at the end of the injection cycle to "seal" the gate area. If the flushing is not complete, then during the next injection cycle there will be some additive in the thermoplastic material in a portion of the skin of the molded plastic article formed. If the additive being considered is a blowing agent, then a swirly surface will result.

Where there is a division point 30 which has several paths therefrom to a mold, care must be exercised as to the step of flushing because generally a different rate of flow of the thermoplastic material will occur within the different paths available. The difference in flow rate along these various paths to the mold cavity is a function of (1) the differences in resistance to flow caused by variations in diameter, and/or length of each path to the mold and (2) the differences in resistance to flow from each path through a particular mold gate as a result of the geometry of the mold. As a general rule of thumb, to insure roughly equivalent flow rates through the various paths, the pressure drop between the division point 30 to each of the injection points 31 and 32 should be substantially the same. Another way to insure complete removal of additive containing plastic material is to have a separate injector for each injection point.

Mixer 14 having a plurality of variously oriented mixer blades 52 provides very efficient mixing of injected thermoplastic material and an added blowing agent or other additive and does not decrease the pressure at the injection points 31 and 32 below about 200 psi. We have found that a static mixer by Kenics Corporation of Danvers, Massachusetts affords sufficient mixing and a pressure drop between the accumulator head and distribution point 30 of approximately 3–5 times that pressure drop caused by a tube of the same length and diameter as that enclosing the mixer but without any mixer elements or blades 52.

Several modifications to FIGS. 1 and 8 in keeping with this invention are: that dump valve 2 may be eliminated if microswitch 7 when activated will stop either the screw of extruder 1 or the reciprocating screw of the injection molding machine 1', that additional microswitches can be added, and that one or more additional means for introducing an additive can be attached to a passageway connecting accumulator 12 or reciprocating screw injector 1' (see FIG. 8) and mixer 14. In the disclosed machines of FIGS. 1 and 8 only one additive at a time can be selectively added. However, with additional microswitches and one or more additional means for introducing an additive, which means is attached downstream of the injector and upstream of the mixer, a molded plastic article can be made having a foamed core without a colorant, a U.V. stabilizer, or the like, and an unfoamed skin containing a colorant or U.V. stabilizer, or the like.

In FIG. 2, there is disclosed a means for introducing a chemical blowing agent or other additive which is in the form of a dispersion. In pressure vessel 40, a dispersion 41 is forced under nitrogen pressure through tube 42 in which there are two valves 43 and 45. Valve 43 is a flow control valve and valve 45 is an on-off electrically controlled valve. There are two kinds of devices for introducing an additive into the molten thermoplastic material. The first is one which injects the blowing agent at the wall 44 of the tube just before the static mixer 14. This form of injection device is shown in FIG. 3. FIG. 2 discloses an in-stream injector comprising a ball valve 49 which prevents the molten thermoplastic material from passing into line 42, and a lower extension 47 which passes through the wall 44 of tube 46. To avoid plugging, holes 50 cause the exit direction of the additive to be in the downstream flow direction of the molten thermoplastic material. The holes 50 are arranged in two parallel rows each of five holes. Each pair of adjacent holes within a row are spaced apart by about ¼ of an inch, and the rows are spaced apart by about 1/16 of an inch. The length of the in-stream injector 47 within tube 46 is about 1¼ inches. To aid mixing, the rows of holes 50 are positioned as shown in FIGS. 2 and 4 on either side of the leading edge of the first of a series of static mixer blades 52.

A measure of the amount of blowing agent added to a SSFC plastic article is the percent reduction in weight of the article which is equal to 100 TIMES (1-weight of the article with a foamed core/weight of the same article with a solid core). A percent reduction in weight between about 5–40% is typical for a plastic article of FIG. 5 having a solid skin 64 and a foamed core 62 with voids 60.

The quantity of blowing agent dispersion that is introduced into injected molten thermoplastic is determined by the pressure in vessel 40, the viscosity of the blowing agent dispersion 41, the diameter of tube 42, the flow permitted by control valve 43 and finally the length of time that on-off valve 45 is maintained in the open configuration. The nitrogen pressure must create sufficient pressure on the blowing agent dispersion so as to maintain the dispersion at a pressure greater than the pressure of the molten thermoplastic material at the point of introduction of the blowing agent into the molten thermoplastic material.

In FIG. 5, there is a swirl-free or unfoamed solid skin foamed core article having voids 60 in a core 62 and solid skin 64 as stated above. The presence or absence of swirl depends upon the thickness of the solid skin 64. The overall thickness of the solid skin depends upon the quantity of non-foamable thermoplastic resin injected at the beginning of the injection cycle.

In FIGS. 6 and 7, there is disclosed an additive 61 selectively added to the skin 64 and core 62, respectively.

EXAMPLE 1

A solid skin foamed core (SSFC) plastic article is injection molded in a step chip mold. The step chip mold is in the form of a series of equally long but increasingly wider steps of increasing thicknesses, i.e., ¼"×10"×12", ⅜"×12"×12" and ½"×17"×12". The overall area of the flat bottom surface is 39"×12". The mold is cooled to a temperature of about 42° F. On the flat side, there are two gates adapted to receive standard ⅜ inch nozzles. One is located in the ¼ inch thick section 1½ inches from a 12 inch end side and 3 inches in from a 39 inch side. The other is in the ½ inch thick section 25½ inches from said 12 inch end side and 3 inches in from said 39 inch side. The thickness of the foamed core and solid skin are approximately 9/64 and about 3/64 inch (opposite gate) or 4/64 inch (gate side) for the ¼ inch section, 17/64 and 3/64 inch (opposite gate) or 4/64 inch (gate side) for the ⅜ inch section, and 22/64 inch and 3/64 inch (opposite gate) or 7/64 inch (gate side) for the ½ inch section, respectively.

Polystyrene having a flow rate of about 6.5 g/10 min. is extruded at a rate of 60 lbs./hr. The extruder has a two-stage screw size 3½ inches in diameter rotating at a rate of 20 revolutions per minute. The temperature of the extruder is set for 450° F. The head pressure and temperature of the polystyrene is 2,700 psi and 500° F., respectively.

The polystyrene from the extruder moves under a pressure of about 2,700 psi through a pipe to an accumulator having an inside diameter of 7 inches. The barrel temperature of the accumulator is 500° F. Polystyrene is transferred to the accumulator until a cam on a piston arm of the accumulator activates a first microswitch. This indicates that the accumulator is full. If the mold is not ready the dump valve opens to remove excess plastic which cannot be injected into the mold. When the mold is ready then the valves or gates in a manifold are opened and polystyrene is injected into the step chip mold.

The speed of the injection shot is about 1 lb./second with a shot weight of 6 lbs. As the accumulator empties, molten polystyrene is ejected in a stream from the accumulator. The amount by weight of this molten stream plus that amount left in the system from the previous cycle determines the total amount by weight of $N_2$-free polystyrene that forms the skin of the finished SSFC article. The distance between the first and second switches is set at 2.75 inches. This molten stream of polystyrene moves past the point for $N_2$ introduction (see FIG. 3) through the Kenics static mixer through a manifold and into a mold. While the proceeding is occurring a cam contacts a second microswitch thereby activating it. A signal is sent opening the valve to the means for introducing $N_2$. With this valve open, $N_2$ under a pressure of about 3,000 psi is introduced into the molten stream of polystyrene which continues to be ejected from the accumulator. That portion of polystyrene passing the point of $N_2$ introduction when the valve is open has $N_2$ introduced therein. A static mixer downstream mixes or disperses the $N_2$ throughout said portion of polystyrene. This portion of polystyrene and $N_2$ exits from the mixer and flows through a manifold and into a mold. Introduction of $N_2$ into the molten polystyrene continues until the cam contacts a third microswitch which sends a signal closing the valve to the means for introducing $N_2$. The distance between the second and third switches is set at 2.00 inches. This distance given the particular speed of the injection shot controls the amount by weight of the foamed core formed in the finished part.

After the third switch is activated, the subsequent stream of ejected polystyrene from the accumulator remains $N_2$-free. It flows past the point of blowing agent introduction and through both the static mixer, and the manifold. A small portion thereof enters the mold "sealing" the gate area. As this subsequent stream moves toward the mold it pushes (flushes) all the polystyrene containing $N_2$ into the mold leaving only $N_2$-free polystyrene between the point of $N_2$ introduction and the entrances to the mold. This flushing continues until the cam contacts a fourth microswitch which closes the gate to the mold. The distance between the third and fourth switches is set at 4.00 inches. The closing of the gate begins the refilling of the accumulator as molten polystyrene from the extruder flows into the accumulator. When the part has cooled sufficiently to be stable and handleable, it is removed from the mold. The empty mold is made ready for the next cycle of $N_2$-free polystyrene to be injected into the mold.

A summary of the process conditions for this example is given in TABLE 1

TABLE 1

CONDITIONS TO FORM A FOAM CORE AND SOLID SKIN ARTICLE USING POLYSTYRENE AND NITROGEN WHERE NITROGEN IS INJECTED AT THE WALL

| | |
|---|---|
| RESIN: | Polystyrene |
| FEED RATE: | 60 lbs./hr. |
| MOLD: | Step Chip*  Temperature: 42° F. |
| EXTRUDER: | Screw: two stage size 3½" in diameter<br>Rotation Rate of screw: 20 rpm<br>Head pressure of plastic: 2700 psi<br>Head temperature of plastic: 500° F.<br>Temperature of extruder: 450° F. |
| ACCUMULATOR: | Barrel temperature: 500° F.<br>Plastic pressure: 2700 psi<br>Diameter: 7 inches |
| ADDITIVE FEED: | Pressure of $N_2$ at point of feed: 3000 psi |
| SWITCH SETTINGS: | Switches  Distances between switches<br>7–8  2.75"<br>8–9  2.00"<br>9–10  4.00" |

*Dimensions of mold are 39" × 12" with portions of ⅛" × 10" × 12", ¼" × 12" × 12", and ⅜" × 17" × 12".

EXAMPLE 2

The same procedure as EXAMPLE 1, except that instead of $N_2$, an azodicarbonamide dispersion is introduced at the wall. The finished part is about the same as EXAMPLE 1. The process conditions are given in TABLE 2.

The viscosity of the azodicarbonamide, in a 50% tris nonylphenyl phosphite dispersion, decreases with increasing temperature. During use, it is heated to about 180° F. Much below 180° F. the dispersion becomes too viscous to transfer. However, with decreasing viscosity the blowing agent has a significant tendency to settle out. Care must be exercised not to allow the dispersion to remain either unused or unstirred for more than one to two hours.

TABLE 2

CONDITIONS TO FORM A SOLID SKIN FOAM CORE ARTICLE USING POLYSTYRENE AND A CHEMICAL BLOWING AGENT INJECTED AT THE WALL

| | |
|---|---|
| RESIN: | Polystyrene |
| FEED RATE: | 60 lbs/hr. |
| MOLD: | Step Chip (see TABLE 1)<br>Temperature: 42° F. |
| EXTRUDER: | Screw: two stage size 3½" in diameter<br>Rotation Rate of screw: 20 rpm<br>Head pressure of plastic: 2700 psi<br>Head temperature of plastic: 500° F.<br>Temperature of extruder: 450° F. |
| ACCUMULATOR: | Barrel temperature: 500° F.<br>Plastic pressure: 2700 psi<br>Diameter: 7 inches |
| ADDITIVE FEED: | *Blowing Agent: Azodicarbonamide dispersion<br>Vessel pressure: 3000 psi<br>Vessel temperature: 180° F. |
| SWITCH SETTINGS: | See Table 1. |

*Azodicarbonamide, Celogen AZ, obtainable from Uniroyal Chemical, Naugatuck, Conn., is in a 50% dispersion of tris nonylphenyl phosphite, Wytox 312, obtainable from Stephen Chemicals.

EXAMPLE 3

The same procedure as followed in EXAMPLE 1, except that instead of injecting the $N_2$ at the wall an in-stream injector (see FIG. 2) is used, and instead of polystyrene, polyethylene having a melt index of about 5.5 g/10 minutes is used. The results are about the same as EXAMPLE 1. The process conditions for this Example are given in TABLE 3.

TABLE 3

CONDITIONS TO FORM A SOLID SKIN FOAM CORE ARTICLE USING POLYETHYLENE AND A BLOWING AGENT INTRODUCED BY MEANS OF AN INSTREAM INJECTOR

| | |
|---|---|
| RESIN: | Polyethylene |
| FEED RATE: | 54 lbs/hr. |
| MOLD: | Step Chip (see TABLE 1)<br>Temperature: 42° F. |
| EXTRUDER: | Screw: two stage size 3½" in diameter<br>Rotation Rate of Screw: 21 rpm<br>Head pressure of plastic: 2800 psi<br>Head temperature of plastic: 500° F.<br>Temperature of extruder: 450° F. |
| ACCUMULATOR: | Barrel temperature: 500° F.<br>Plastic pressure: 2700 psi<br>Diameter: 7 inches |
| BLOWING AGENT FEED: | Blowing Agent: $N_2$<br>$N_2$ pressure: 3000 psi. |
| SWITCH SETTINGS: | See Table 1 |

EXAMPLE 4

In this example a molded plastic step chip is formed wherein a dye dispersion of blue Liqui-kolor, obtainable from Inmont Corporation, Chicago, Ill., is selectively introduced only into the skin.

About 10 lbs. of a dye dispersion of blue Liqui-Kolor is introduced into a pressurizable vessel. The viscosity is adjusted by the addition of tris nonylphenyl phosphite, Wytox 312. A pressure of about 3,000 psi is applied by compressed $N_2$. The pressure vessel is connected to an in-stream injector. A single on-off solenoid valve and one way valve control the flow of the dye dispersion from the vessel into the in-stream injector.

The same mold and mold temperatures as EXAMPLE 1 are used.

Polyethylene having a melt index of about 5.5 g/10 minutes is extruded at a rate of 54 lbs./hr. under a pressure and temperature at the head of the extruder of 2,800 psi and 500° F., respectively, from an extruder having a two stage screw with a diameter of about 3½ inches rotating 21 revolutions per minute and set to have a barrel temperature of 450° F.

The polyethylene from the above extruder is fed into an accumulator having a barrel temperature of 500° F. with a diameter of 7 inches wherein a back-pressure of about 2,700 psi is maintained.

When a cam on the piston of said accumulator activates a first microswitch this signals that the accumulator is full and if the mold is ready, three valves are opened simultaneously. These are the two valves to the gates of the step chip mold and the on-off valve between the pressure vessel and the in-stream injector.

A molten polyethylene is ejected in a stream at a rate of about 1 lb./sec. As said stream passes the in-stream injector, the dye dispersion is introduced therein, and as said stream with dye therein passes through a Kenics static mixer, the dye is dispersed uniformly throughout. Said on-off valve is closed when said cam activates a second microswitch 2.75 inches from said first microswitch. The subsequent molten polyethylene ejected in a stream from the accumulator, which passes the in-stream injector after the on-off valve is closed, does not have dye introduced therein. This subsequent stream continues past the in-stream injector through the Kenics mixer and into the mold. All polyethylene having dye within is thereby flushed from the system into the mold. The amount by weight of dye-free polyethylene in said subsequent stream will determine the weight of the core formed in the finished molded article. The on-off valve remains closed until a third microswitch is activated. This third microswitch is set 2.00 inches from said second microswitch. The final portion in a stream of ejected polyethylene which passes the in-stream injector while the on-off valve is open has dye introduced therein. As this final portion passes through the Kenics mixer toward the mold gates it replaces all dye-free polyethylene from between the point of dye introduction to these mold gates. A small amount of this final portion containing dye enters the mold to "seal" the gate area. Finally, a fourth microswitch is activated which simultaneously closes the two gate valves and the on-off valve to the dye dispersion. The distance between said third and fourth microswitches is set at 4.00 inches. With the mold gates closed the accumulator begins to fill for the next injection cycle.

When the molded article has sufficiently cooled, it is removed from the mold and the mold is made ready for the next cycle. The total time for one complete cycle is about 12 seconds.

EXAMPLE 5

In this example, the procedure of EXAMPLE 4 and the process conditions shown in TABLE 2 are used except that in place of a blowing agent dispersion, a 25% flame retardant additive consisting of 2 parts decabromodiphenyl oxide to 1 part $Sb_2O_3$ in tris nonylphenyl phosphite, Wytox 312 is used.

It is to be noted that the usual latitude as to temperature and time is made possible with the disclosed process. However, when prior art processes were employed, the molding temperature of the plastic had to be held to about 470° F. and time consuming purging is required to avoid degradation of the fire retardant additive.

The examples disclosed are intended to be illustrative only and variations are readily apparent to those skilled in the art based upon the teachings herein and are within the scope of the intended invention.

The invention which is claimed is:

1. The method for producing injection molded plastic articles from a thermoplastic resin containing an additive comprising:
   (1) melting a thermoplastic resin;
   (2) transferring said thermoplastic resin to an accumulation zone where it is maintained in a molten state;
   (3) when sufficient molten resin is in said accumulation zone to fill a mold, ejecting said molten resin from said accumulation zone to form a resin stream which is channeled past a point for introducing an additive, through a mixing zone and into said mold;
   (4) introducing an additive into a preselected portion of said resin stream to form a product of step (4); and,
   (5) channeling the product of step (4) through said mixing zone and into said mold.

2. The method of claim 1 wherein said preselected portion of said resin stream is that portion of said resin stream which forms the skin of the molded article.

3. The method of claim 1 wherein said preselected portion of said resin stream is that portion of said resin stream which forms the core of the molded article.

4. The method of claim 2 wherein said additive is selected from the group of additives consisting of U.V. stabilizers, flame retardants, and colorants.

5. The method of claim 3 wherein said additive is a blowing agent.

* * * * *

UNITED STATES PATENT OFFICE
CERTIFICATE OF CORRECTION

Patent No. 4,255,367          Dated March 10, 1981

Inventor(s) Clarence W. Wallace and Howard A. Koenig

It is certified that error appears in the above-identified patent and that said Letters Patent are hereby corrected as shown below:

Patent Reads

| Col. | Line | |
|---|---|---|
| 2 | 32 | "of" should be --for-- |
| 7 | 15 | "TIMES" should be --times-- |
| 8 | 68 | "TABLE 1" should be --TABLE 1.-- |
| 9 | 66 | "Stephen" should be --Stepen-- |
| 10 | 38 | "Liqui-kolor" should be --Liqui-Kolor-- |

Signed and Sealed this

Eighteenth Day of August 1981

[SEAL]

Attest:

Attesting Officer

GERALD J. MOSSINGHOFF

Commissioner of Patents and Trademarks